Figure 1:
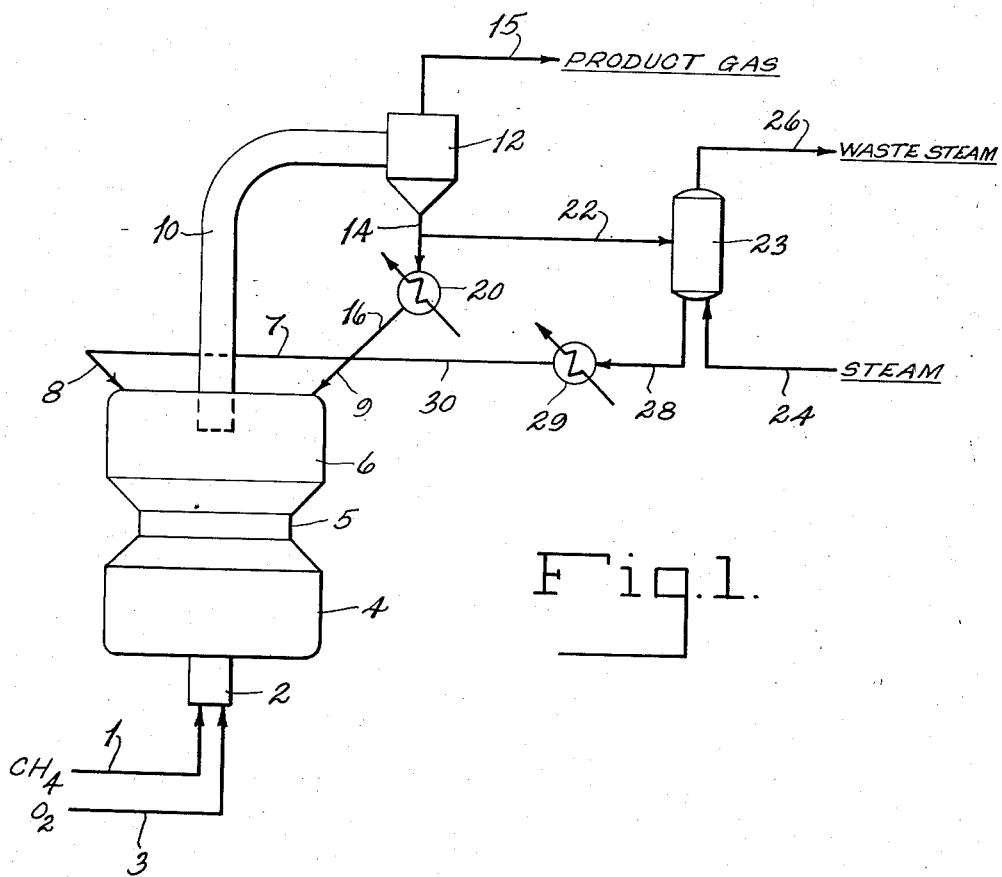

Oct. 26, 1954

H. R. PICHLER ET AL 2,692,902

PRODUCTION OF ACETYLENE

Filed March 28, 1952

2 Sheets-Sheet 1

INVENTORS
HELMUT R. PICHLER
MICHAEL C. CHERVENAK
BY
*J. H. Graham*
ATTORNEY

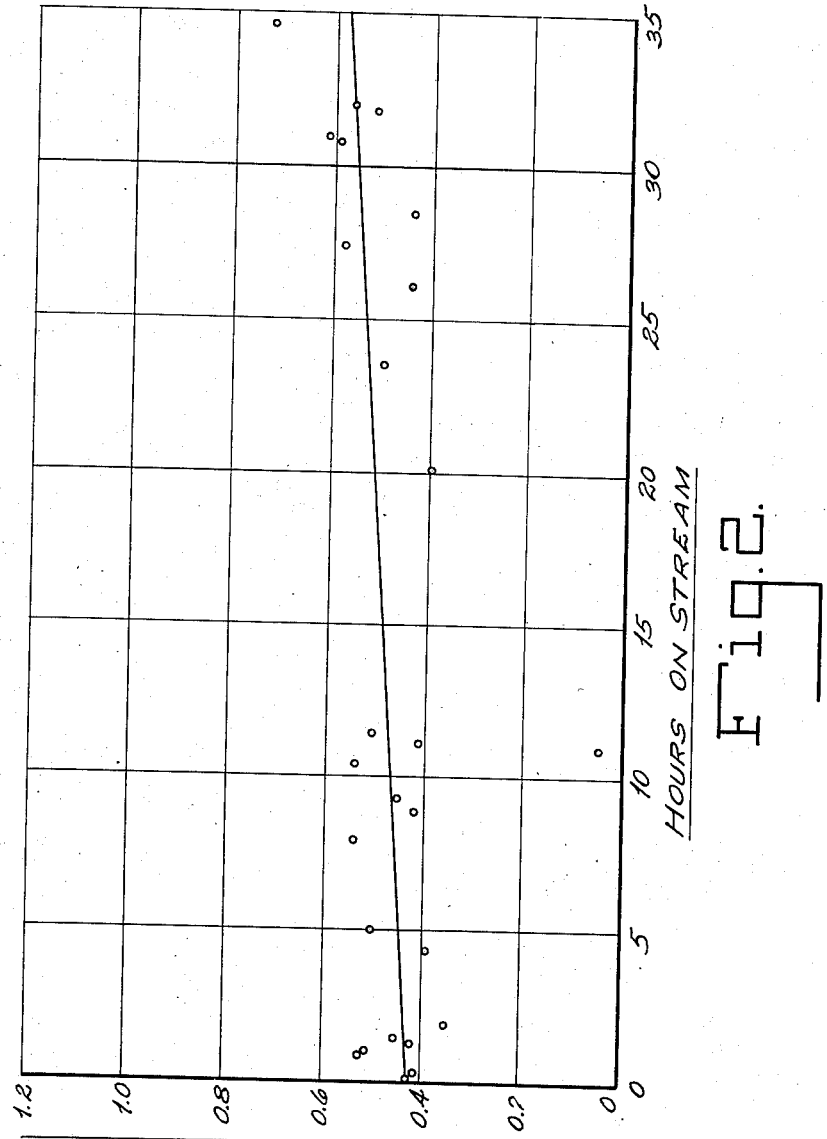

Patented Oct. 26, 1954

2,692,902

UNITED STATES PATENT OFFICE 2,692,902

PRODUCTION OF ACETYLENE

Helmut R. Pichler and Michael C. Chervenak, Trenton, N. J., assignors to Hydrocarbon Research, Inc., New York, N. Y., a corporation of New Jersey Application March 28, 1952, Serial No. 279,038

10 Claims. (Cl. 260—679)

This invention relates to an improvement in the production of acetylene by the thermal decomposition of hydrocarbons. It is particularly concerned with a novel method for quenching the acetylene-containing gas produced by thermal decomposition of hydrocarbons.

Three processes have been developed for producing acetylene from hydrocarbons. They are the electric arc process, the partial combustion of methane with oxygen at elevated temperatures and short contact times, and the thermal cracking of natural gas in a regenerative furnace. In all of these processes, which are effected at elevated temperatures, it is necessary to cool the acetylene-containing product gas as quickly as possible in order to minimize decomposition or other undesired reactions of the thermally unstable acetylene. Water spray and solid particle quenching have been employed to effect rapid cooling of the acetylene-containing product gas. The introduction of finely divided particles of a heat carrier such as alumina, silica and coke has been found to be a particularly efficient means of quenching the product gas because of the heat capacity and heat transmission properties of a particulate solid. The subject invention involves the discovery that quenching of acetylene-containing product gas with an activated carbon having an iodine number higher than 100 not only effects rapid quenching of the product gas, but also causes decomposition of by-products such as diacetylene and vinyl acetylene whose presence greatly complicates the recovery of pure acetylene from the product gas because of their highly explosive nature.

In accordance with the process of the invention, quenching of acetylene-containing gas produced by the thermal decomposition of a hydrocarbon is effected by the introduction of finely divided particles of activated carbon having an iodine number greater than 100. By contacting the hot product gas with finely divided activated carbon particles of prescribed iodine number, the gas may be rapidly and efficiently cooled to a temperature below about 800° F., while simultaneously the diacetylene and vinyl acetylene concentration of the product gas is reduced to less than one half of their concentration in a gas which is conventionally quenched with water or alumina. The activated carbon quench is particularly effective in decomposing diacetylene, but also substantially reduces the vinyl acetylene content of the product gas. The decomposition of higher acetylenes by activated carbon having an iodine value greater than 100 is effected without change in the acetylene content of the product gas.

All known processes for acetylene production by thermal decomposition of a gaseous hydrocarbon yield a product gas in which acetylene is a minor constituent comprising approximately 7 to 15 per cent by volume thereof. For example, the product stream produced by the high temperature-short contact time partial combustion of a gaseous hydrocarbon such as methane contains, on a dry basis, approximately 7 to 9 per cent by volume acetylene, 0.1 to 0.2 per cent benzene and higher boiling aromatics, 0.20 to .75 per cent higher acetylene such as vinyl acetylene and diacetylene, 3 to 5 per cent carbon dioxide, 50 to 60 per cent hydrogen, 25 to 30 per cent carbon monoxide, 3 to 6 per cent methane, and 0.1 to 0.5 per cent ethylene. The occurrence of the higher acetylenes in the product gas is illustrated by the following typical higher acetylene analysis of a product gas obtained by partial oxidation of methane with oxygen: diacetylene, 0.32 per cent, methyl acetylene, 0.18 per cent, and vinyl acetylene, 0.06 per cent. It has been discovered in partial combustion of methane that the diacetylene concentration of the product gas is a function of the acetylene concentration; for example, when the product gas contains 8 to 9 per cent acetylene, the diacetylene concentration usually falls between 0.2 and 0.35 per cent, whereas with 7 per cent acetylene concentration in the product gas, the diacetylene content usually falls between 0.15 and 0.2 per cent.

Hereafter, the process of the invention will be described in conjunction with the high temperature-short contact time partial combustion of a hydrocarbon such as methane, although it is repeated that the novel quenching process of the invention is applicable to other methods of preparing acetylene by thermal decomposition of hydrocarbons. The partial combustion of methane is usually effected at a temperature between 2,500 and 3,000° F., at atmospheric pressure, at an O/C ratio between 1.1 and 1.4 and at a contact time between 0.001 and 0.1 second The product gas issuing from the combustion zone at a temperature of approximately 2,800° F. is immediately contacted with relatively cool activated carbon having an iodine value above the prescribed minimum of 100 with the resulting rapid cooling of the product gas to a temperature below 800° F. Rapid cooling of the product gas to a temperature below 800° F. and preferably to a temperature in the range of 650 to 750° F. is effected in a fraction of a second, usually in less than about 0.1 second, by contact with the finely divided particles of activated carbon, desirably of a particle size in the range of 40 to 300 mesh.

The activated carbon particles are introduced into the quench zone at a temperature desirably in the range of 250 to 600° F. Quenching of the product gas to a temperature below 800° F. is generally effected by the introduction of 0.4 to 2 pounds of activated carbon per cubic foot of product gas from the combustion zone. When the activated carbon is introduced at a temperature of about 300° F., it has been found that rapid quenching of the product gas to a temperature below 800° F. is effected by the use of 0.6 pound of activated carbon per cubic foot of gas leaving the combustion zone.

In order to effect decomposition of higher acetylenes in conjunction with quenching of the product gas, it is necessary to employ an activated carbon which has a minimum iodine value of 100. Powdered petroleum coke and graphite, which possess iodine values less than 100, are not employed in the process of the invention. When a carbon having a low iodine value, for example, petroleum coke with an iodine number of 13, is employed to quench the acetylene-containing product gas, decomposition of higher acetylenes is not effected so that the distribution of products in the quench gas is the same as when other non-carbonaceous particulate solids such as alumina, sand, etc. are used as quenching agents. While a minimum iodine value of 100 has been set for the activated carbon to be used in this invention, it is recommended that the activated carbon have an iodine value of at least 300 and preferably be in the range of 500 to 1,300. The decomposition of higher acetylenes during the quenching operation is particularly noticeable when activated carbon possessing an iodine value of 500 and higher is employed as the quenching agent.

The powdered activated carbon quenching agent is usually continuously removed from the quenching zone by suspension in the stream of product gas and is separated from the cooled product gas by conventional means for separating solids from gases such as cyclone separators. The separated quenching agent, after being cooled, e. g., to a temperature of about 450° F., is recycled to the quenching zone to effect further quenching and decomposition of higher acetylenes.

Continued recycle of the activated carbon to the quench zone results in a gradual decrease in its iodine value and an accompanying decrease in its effectiveness in decomposing higher acetylenes. It has been discovered that the quench material is regenerated to a high level of effectiveness in decomposing higher acetylenes by treatment with steam at an elevated temperature, say between 1,600 and 2,000° F. For example, a spent activated carbon whose iodine value has dropped from 1,200 to 110 was regenerated by steam treatment at an elevated temperature of 1,750° F. for a period of about 10 minutes. Steam treatment at this temperature raised the iodine value of the activated carbon to about 1,100 and there was no noticeable difference in the effectiveness of the regenerated activated carbon and the fresh activated carbon with respect to higher acetylene decomposition.

In the accompanying Figure 1, there is diagrammatically illustrated the process of this invention for effecting decomposition of higher acetylenes in an acetylene-containing product gas during the quenching operation by use of an activated carbon having an iodine value of about 600.

Natural gas which has been preheated to a temperature of about 1,000° F. is introduced through a pipe 1 into a burner 2 wherein there is effected intimate mixing of the natural gas with oxygen which has been preheated to a temperature of about 1000° F. and which is introduced into the burner 2 through a pipe 3. The O/C ratio of the mixture of natural gas and oxygen into the burner 2 is in the range of 1.1 to 1.4. In the combustion zone 4, natural gas and oxygen are reacted at a temperature of about 2,800° F., at atmospheric pressure and at a contact time preferably in the range of 0.001 to 0.01 second to yield a product gas comprising approximately 8 per cent by volume (dry basis) of acetylene and containing 0.32 per cent diacetylene, 0.18 per cent methyl acetylene and 0.06 per cent vinyl acetylene.

The product gas at reaction temperature issues through the combustion zone 4 through a constricted passage 5 into a quench zone 6. In the quench zone 6, the product gas is contacted with activated carbon having an iodine value of about 600 and having a particle size mainly between 100 and 200 mesh. The activated carbon is introduced through manifold 7 and entry ducts 8 and 9 at a temperature of about 400° F. into the quench zone 6 in an amount equivalent to 0.85 pound of carbon per cubic foot of product gas leaving the combustion zone 4. Contact of the hot product gas with the cool powdered activated carbon results in cooling of the product gas to a temperature of about 650 to 750° F. in less than 0.1 second.

The carbon particles are entrained in the cooled product gas and are carried out of the quench zone 6 through conduit 10 which leads to a gas-solid separator 12. The solid particles are separated from the cooled product gas in the separator 12 and removed therefrom through a pipe 14.

There is removed from the separator 12 through a pipe 15 a product gas in which the diacetylene and vinyl acetylene content has been substantially reduced. The product gas issuing through the pipe 15 has the following content of acetylene and higher acetylenes: 8.1 per cent by volume acetylene, 0.14 per cent diacetylene, 0.04 per cent vinyl acetylene and 0.13 per cent methyl acetylene. The higher acetylenes content of the treated product gas is less than half the content of higher acetylenes in the product gas issuing from the combustion zone.

The product gas is sent to a recovery system wherein acetylene is separated from the other components of the gas. The recovery of acetylene from the product gas is not a part of the process of this invention, but the recovery system is substantially simplified by the decomposition of higher acetylenes during the quenching of the product gas with activated carbon having an iodine value of at least 100. There is a number of well-known procedures for effecting separation of acetylene from the carbon monoxide, hydrogen, carbon dioxide and methane components of the product gas; these procedures involve absorption of the acetylene from the product gas with solvents such as water, furfural, dimethyl formamide and tris-dimethylamido phosphate.

The carbon particles separated from the cooled product gas in the separator 12 are recycled through pipes 14, 16, 7, 8 and 9 to the quench zone 6 after it has been cooled to a temperature of about 400° F. in an exchanger 20. Since the iodine value of the activated carbon is gradually decreased during its use in quenching the product gas with an accompanying decrease in its efficiency in decomposing higher acetylene, a portion of the activated carbon is continuously withdrawn from the pipe 14 through a pipe 22 and introduced into a reactor 23 wherein it is regenerated by contact with super-heated steam at a temperature of about 1,700° F. Superheated steam employed for reactivating the carbon is introduced through a pipe 24 into the reactor 23 wherein it contacts the carbon and is withdrawn therefrom together with decomposition products removed from the activated carbon through a pipe 26.

Reactivated carbon having an iodine value about 600 is withdrawn from the reactor 23 through a pipe 28, cooled to a temperature of about 400° F. in an exchanger 29 and then transported through a pipe 30 to manifold 7 and entry ducts 8 and 9.

The process of the invention is illustrated by the following four examples wherein there are compared the effects on the higher acetylenes content of the product gas employing activated carbon of prescribed iodine number, powdered carbon having an iodine value less than 100 and conventional particulate solid quenching materials such as alumina. The four examples involved the same general process conditions, viz.: 10,000 cubic feet of natural gas and 6,200 cubic feet of oxygen (approximately 96 per cent by volume purity), measured at standard conditions, and preheated to a temperature of 1000° F., were charged hourly to a reaction zone wherein they underwent partial combustion at a temperature of about 2,800° F. to form 23,800 cubic feet (standard conditions) of product gas which was immediately contacted with particulate quenching agent (as set forth in the table below) whereby the product gas was quenched in a period of less than about 0.1 second to a temperature of about 700° F. The quenching agent in the form of principally 100 to 200 mesh particles was introduced into the quench zone at a temperature of about 400° F. at an hourly rate of 20,000 pounds. The product gas had the following approximate volume composition on a water-free basis:

| | Per cent |
|---|---|
| Hydrogen | 55.2 |
| Carbon monoxide | 27.1 |
| Methane | 4.9 |
| Carbon dioxide | 3.5 |
| Acetylene | 8.5 |

The content of higher acetylenes, particularly diacetylene, vinyl acetylene and methyl acetylene, in the product gas varied, however, with the quenching agent used as shown in the following table:

| Example | 1 | 2 | 3 | 4 |
|---|---|---|---|---|
| Quenching Agent | Activated Carbon (Iodine No. 1200) | Activated Carbon (Iodine No. 600) | Alumina | Petroleum Coke (Iodine No. 13) |
| Diacetylene (Vol. percent) | 0.13 | 0.15 | 0.32 | 0.32 |
| Vinyl Acetylene (Vol. percent) | 0.05 | 0.10 | 0.10 | 0.10 |
| Methyl Acetylene (Vol. percent) | 0.10 | 0.10 | 0.18 | 0.18 |

The foregoing examples clearly demonstrate the efficacy of activated carbon of prescribed iodine value in substantially reducing the higher acetylenes content of the product gas during the quenching operation. It will be observed that the diacetylene content of the product gas quenched with activated carbon is approximately half that in the product gas quenched with alumina or petroleum coke of low iodine value. The decomposition of the higher acetylenes greatly minimizes the hazards and process difficulties involved in the isolation of high-purity acetylene from the product gas.

In accompanying Figure 2, there are graphically presented the improved results obtained using activated carbon with an iodine number of about 1300 as quenching agent in comparison with conventional alumina quench. This graph shows the ratio of diacetylene obtained with the activated carbon quench to the diacetylene obtained with an alumina quench at the same acetylene concentration as a function of time on stream. In this graph, hours on stream are plotted on the abscissa and ratio of diacetylene obtained with activated carbon quench to diacetylene obtained with alumina quench is plotted on the ordinate; during these tests, the acetylene content of the product gas was approximately 7.5 per cent by volume. It will be observed that even after about 33 hours on stream quenching with activated carbon without carbon regeneration yields a product gas which contains approximately only half the diacetylene content obtained with alumina quench.

It is apparent that the process of this invention prescribing the use of an activated carbon of a minimum iodine number for quenching acetylene-containing gas produced by thermal decomposition of a hydrocarbon is of substantial benefit and value to the modern production of acetylene. The decrease of the diacetylene and vinyl acetylene contents of the product gas effected by the process of the invention greatly minimizes the difficulties and hazards involved in recovering high-purity acetylene from the product gas.

Obviously, many modifications and variations of the invention, as hereinbefore set forth, may be made without departing from the spirit and scope thereof and, therefore, only such limitations should be imposed as are indicated in the appended claims.

We claim:

1. In the production of acetylene by the partial combustion of a gaseous hydrocarbon with oxygen at a temperature above about 2,500° F., the improvement which comprises quenching the acetylene-containing product gas to a temperature below about 800° F. by bringing said product gas at substantially said reaction temperature into contact with relatively cool particles at a temperature not above about 600° F. of activated carbon characterized by an iodine value of not less than 100, whereby higher acetylenes present in the product gas are decomposed during the quenching step.

2. The improvement according to claim 1 in which the activated carbon has an iodine value of not less than 300.

3. The improvement according to claim 1 in which the activated carbon has an iodine value of not less than 500.

4. The improvement according to claim 1 wherein particles of activated carbon introduced into the acetylene-containing product gas are predominantly in the range of 40 to 300 mesh.

5. The improvement according to claim 1 wherein 0.4 to 2 pounds of activated carbon are introduced into each cubic foot of acetylene-containing product gas during the quenching step.

6. In the production of acetylene by the thermal decomposition of a gaseous hydrocarbon at a temperature above about 2,000° F., the improvement which comprises quenching the acetylene-containing product gas to a temperature below about 800° F. by bringing said product gas at substantially said reaction temperature into contact with relatively cool particles at a temperature not above about 600° F. of activated carbon characterized by an iodine value of not less than 100, whereby higher acetylenes present in the product gas are decomposed during the quenching step, separating the carbon particles from the quenched product gas, continuously cooling and recycling a portion of the separated carbon particles to said quenching step, regenerating the remaining portion of said separated carbon particles by contact with steam at a temperature between 1,600 and 2,000° F., cooling said regenerated carbon particles, and returning the cooled particles to said quenching step.

7. In the production of acetylene by the thermal decomposition of a hydrocarbon at an elevated temperature above about 2,000° F., the improvement which comprises quenching acetylene-containing product gas to a temperature below about 800° F. by contacting said product gas at substantially said reaction temperature with particles of activated carbon at a temperature not above about 600° F., said particles having an iodine value of not less than 100, whereby higher acetylenes are removed from the product gas during the quenching step.

8. A process according to claim 7 wherein the activated carbon has an iodine value of not less than 300.

9. A process according to claim 7 wherein the activated carbon has an iodine value of not less than 500.

10. A process as defined in claim 7 wherein said particles of activated carbon are predominantly of a size within the range of 40 to 300 mesh.

References Cited in the file of this patent

UNITED STATES PATENTS

| Number | Name | Date |
|---|---|---|
| 1,894,763 | Eisenhut et al. | Jan. 17, 1933 |
| 1,973,840 | Zobel et al. | Sept. 18, 1934 |
| 2,582,415 | Claussen | Jan. 15, 1952 |